US012259829B2

(12) United States Patent
Walker et al.

(10) Patent No.: US 12,259,829 B2
(45) Date of Patent: *Mar. 25, 2025

(54) MEMORY HAVING INTERNAL PROCESSORS AND DATA COMMUNICATION METHODS IN MEMORY

(71) Applicant: Lodestar Licensing Group, LLC, Evanston, IL (US)

(72) Inventors: Robert M. Walker, Raleigh, NC (US); Dan Skinner, Boise, ID (US); Todd A. Merritt, Boise, ID (US); J. Thomas Pawlowski, Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/436,919

(22) Filed: Feb. 8, 2024

(65) Prior Publication Data

US 2024/0184724 A1    Jun. 6, 2024

Related U.S. Application Data

(60) Continuation of application No. 17/864,629, filed on Jul. 14, 2022, now Pat. No. 11,914,530, which is a
(Continued)

(51) Int. Cl.
*G06F 13/16* (2006.01)
*G06F 3/06* (2006.01)
(Continued)

(52) U.S. Cl.
CPC ........ *G06F 13/1673* (2013.01); *G06F 3/0613* (2013.01); *G06F 3/0625* (2013.01);
(Continued)

(58) Field of Classification Search
CPC .. G06F 13/1673; G06F 3/0613; G06F 3/0625; G06F 3/0659; G06F 3/0683;
(Continued)

(56) References Cited

U.S. PATENT DOCUMENTS 6,195,733 B1    2/2001    Nair et al.
6,754,802 B1    6/2004    Kirsch
(Continued)

FOREIGN PATENT DOCUMENTS

CN    101226770 A    7/2008

OTHER PUBLICATIONS

NPL Draper et al. "The Architecture of the DIVA Processing-In-Memory Chip" ICS'02, 2002 (Year: 2002).*
(Continued)

*Primary Examiner* — Hosain T Alam
*Assistant Examiner* — Zubair Ahmed
(74) *Attorney, Agent, or Firm* — Fletcher Yoder, P.C.

(57) ABSTRACT

Memory having internal processors, and methods of data communication within such a memory are provided. In one embodiment, an internal processor may concurrently access one or more banks on a memory array on a memory device via one or more buffers. The internal processor may be coupled to a buffer capable of accessing more than one bank, or coupled to more than one buffer that may each access a bank, such that data may be retrieved from and stored in different banks concurrently. Further, the memory device may be configured for communication between one or more internal processors through couplings between memory components, such as buffers coupled to each of the internal processors. Therefore, a multi-operation instruction may be performed by different internal processors, and data (such as intermediate results) from one internal processor may be transferred to another internal processor of the memory, enabling parallel execution of an instruction(s).

20 Claims, 5 Drawing Sheets

Related U.S. Application Data continuation of application No. 15/288,077, filed on Oct. 7, 2016, now Pat. No. 11,403,240, which is a division of application No. 12/603,376, filed on Oct. 21, 2009, now Pat. No. 9,477,636.

(51) Int. Cl.
  *G06F 9/30* (2018.01)
  *G06F 12/0813* (2016.01)
  *G06F 13/40* (2006.01)
  *G06F 15/78* (2006.01)

(52) U.S. Cl.
  CPC .......... *G06F 3/0659* (2013.01); *G06F 3/0683* (2013.01); *G06F 9/3001* (2013.01); *G06F 9/30043* (2013.01); *G06F 12/0813* (2013.01); *G06F 13/4068* (2013.01); *G06F 15/7821* (2013.01); *G06F 3/067* (2013.01)

(58) Field of Classification Search
  CPC ............... G06F 9/3001; G06F 9/30043; G06F 12/0813; G06F 13/4068; G06F 15/7821; G06F 3/067; G06F 12/00; G06F 12/08; G06F 12/12; G06F 13/00; G11C 7/12
  USPC .................................................. 710/305, 100
  See application file for complete search history.

(56) References Cited

U.S. PATENT DOCUMENTS

| | | |
|---|---|---|
| 6,970,988 B1 | 11/2005 | Chung |
| 8,234,460 B2 | 7/2012 | Walker |
| 8,380,916 B2 | 2/2013 | Walker |
| 8,521,958 B2 | 8/2013 | Walker |
| 8,719,516 B2 | 5/2014 | Walker |
| 2001/0010057 A1 | 7/2001 | Yamada |
| 2005/0024983 A1 | 2/2005 | Kirsch |
| 2007/0220195 A1 | 9/2007 | Kawaguchi |
| 2008/0126690 A1 | 5/2008 | Rajan et al. |
| 2010/0312997 A1 | 12/2010 | Walker |
| 2010/0312998 A1 | 12/2010 | Walker |
| 2010/0313000 A1 | 12/2010 | Walker |

OTHER PUBLICATIONS

NPL Draper et al. "A Prototype Processing-In-Memory (PIM) Chip for Data-Intensive Architecture (DIVA) System" Journal of VLSI Signal Processing, 2005 (Year: 2005).*

Draper, Jeffrey, et al.; A Prototype Processing-In-Memory (PIM) Chip for the Data-Intensive Architecture (DIVA) System; The Journal of VLSI Signal Processing, Kluwer Academic Publishers, BO, vol. 40, No. 1, May 1, 2005, pp. 73-84, XP019216639.

Draper, Jeffrey, et al.: "The architecture of the DIVA processing-in-memory chip," ISC'02 Proceedings of the 16th International Conference on Supercomputing, Jun. 22-26, 2002, pp. 14-25.

European Office Action mailed Apr. 22, 2014 in counterpart European Application No. 10 769 122.2-1957.

Taiwan Office Action mailed Apr. 24, 2014 in counterpart Taiwan Application No. 099135499.

Chinese Office Action mailed Apr. 30, 2014 in counterpart Chinese Application No. 2010800477542.

* cited by examiner

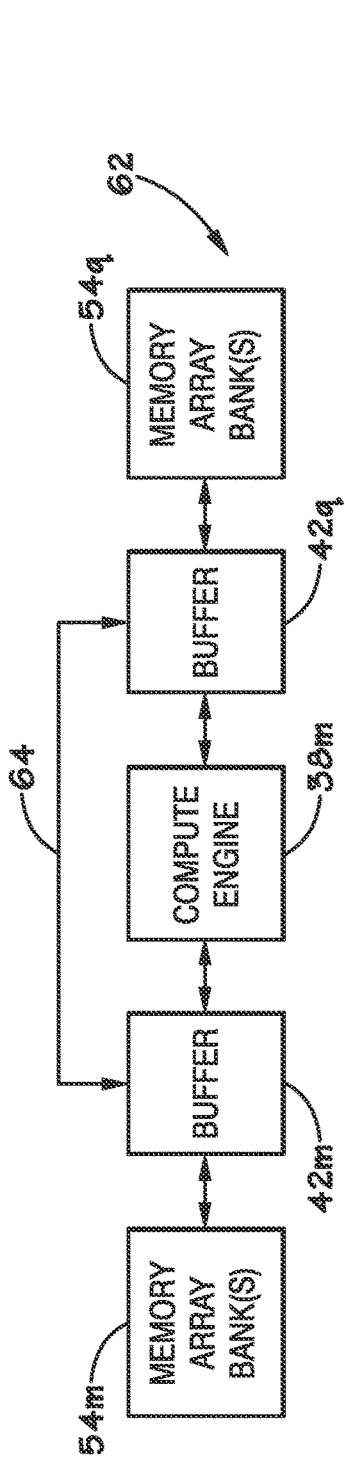
FIG. 6
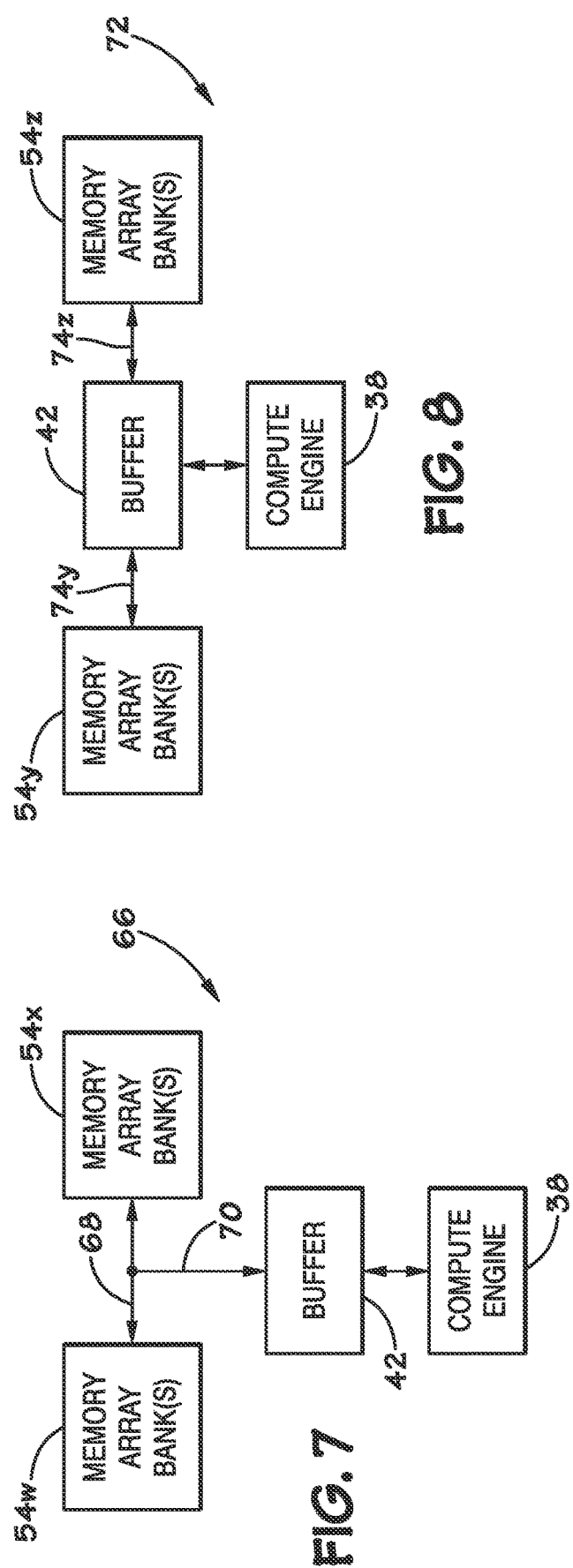
FIG. 7
FIG. 8

MEMORY HAVING INTERNAL PROCESSORS AND DATA COMMUNICATION METHODS IN MEMORY

CROSS REFERENCE TO RELATED APPLICATION

This application is a continuation of U.S. patent application Ser. No. 17/864,629 entitled "Memory Having Internal Processors and Data Communication Methods in Memory," filed on Jul. 14, 2022, which is a continuation of U.S. patent application Ser. No. 15/288,077, entitled "Memory Having Internal Processors and Data Communication Methods in Memory," filed Oct. 7, 2016, which is a divisional of U.S. patent application Ser. No. 12/603,376, entitled "Memory Having Internal Processors and Data Communication Methods in Memory", filed Oct. 21, 2009, all of which are incorporated herein by reference in their entirety.

BACKGROUND

Field of Invention

Embodiments of the invention relate generally to memory, such as memory devices and memory systems, and more particularly, to memory having internal processors.

Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more processors, which may retrieve and execute instructions, and store (e.g., retire) the results of the executed instruction, such as instructions to store the results to a suitable location. A processor may generally use arithmetic logic unit (ALU) circuitry to execute instructions, such as arithmetic and logic operations, on data, such as one or more operands. For example, the ALU circuitry may add, subtract, multiply, or divide one operand from another, or may subject one or more operands to logic operations, such as AND, OR, XOR, and NOT logic functions. A processor may execute instructions having different degrees of complexity, and different instructions may involve inputting the operand(s) through the ALU circuitry in one or multiple clock cycles.

A number of components in the electronic system may be involved in directing a set of instructions to the ALU for execution. In some devices, the instructions may be generated by a controller, or some other suitable processor in the electronic system. Data (e.g., the operands on which the instructions will be executed) may be stored in a memory device (e.g., a memory array) that is accessible by the ALU. The instructions and data may be retrieved from the memory device and sequenced and/or buffered before the ALU begins to execute instructions on the data. Furthermore, as different types of operations may be executed in one or multiple clock cycles through the ALU, intermediate results of the instructions and/or data may also be sequenced and/or buffered.

Typically, a processor (e.g., the ALU circuitry) may be external to the memory array, and data is accessed via a bus between the processor and the memory array to execute a set of instructions. As processing speed may be limited by the bandwidth of the bus, processing performance may be improved in a processor-in-memory (PIM) device, where the processor is implemented internal to a memory (e.g., directly on the memory device), conserving time and power in processing. Furthermore, processing power may also be improved by writing, reading, sequencing, buffering, and executing instructions and/or data substantially simultaneously for different instructions, or different parts (operations) of an instruction.

BRIEF DESCRIPTION OF DRAWINGS

Certain embodiments are described in the following detailed description and in reference to the drawings in which:

FIG. 6 illustrates a portion of a memory having an internal processor, wherein the internal processor is coupled to two or more buffers and banks of a memory array, and wherein the buffers are coupled together, in accordance with one or more embodiments of the present technique;

FIG. 7 illustrates a portion of a memory having two or more memory array banks coupled via a bidirectional bus, both accessible to an internal processor, in accordance with one or more embodiments of the present technique; and FIG. 8 illustrates a portion of a memory having two or more memory array banks each coupled to an internal processor, in accordance with one or more embodiments of the present technique.

DETAILED DESCRIPTION

Figure 1:
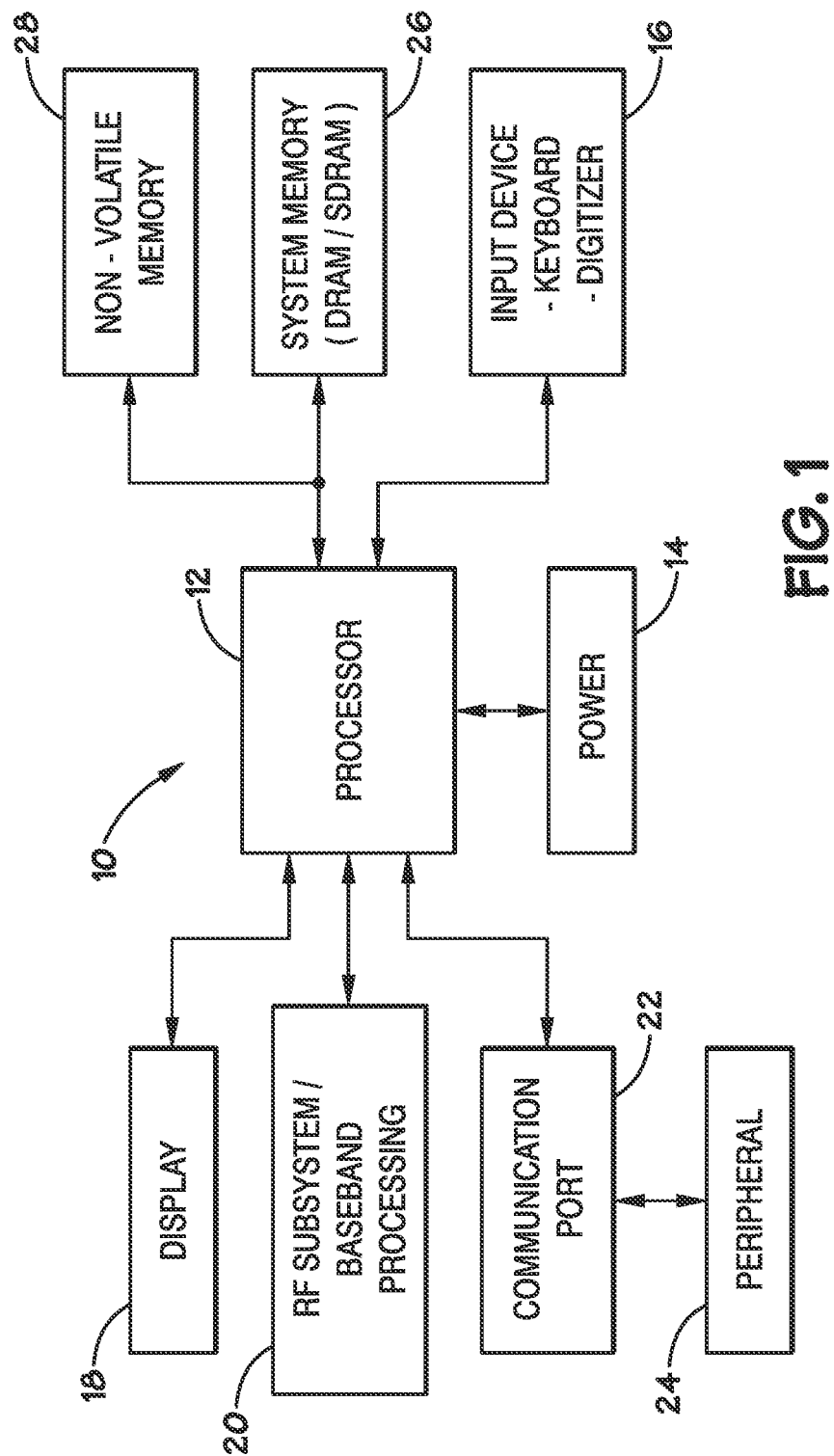
FIG. 1 depicts a block diagram of a processor-based system in accordance with an embodiment of the present technique.

An electronic device may generally use a processor to process instructions in multiple stages. Processing the instructions may include executing the instructions, and storing the results of the executed instructions. For example, instructions, and the data on which the instructions will be executed, may be sent by an external processor (e.g., a memory controller) to an internal processor (e.g., ALU circuitry). The instructions and/or data may first be stored in a memory array to be retrieved when the internal processor is available to execute the instructions. Once the instruction(s) have been executed, the internal processor may store the results of the instruction(s) in a memory component, the memory array, or to any other suitable output.

A processor that is external to the memory may employ an external bus to transfer information (e.g., instructions and/or data) to and from the memory array. Processing efficiency may be partly limited by the bandwidth of the external bus, as transferring information between a memory array and a processor may consume power and time. In one or more embodiments, a memory may conserve power by allowing information to be transferred between the memory array and a processor without an external bus.

In accordance with the present techniques, one or more processors, such as ALUs, may be packaged with a memory device. For example, the memory may be a processor-in-memory (PIM), and may include ALUs embedded on a memory device (e.g., a memory array), which may store instructions and data to be executed by the ALUs and the results from the executed instructions. In other embodiments, the ALUs and the memory array may be on unique dies in the same package. For example, the ALUs and the memory array may be arranged in a multi-chip package (MCP), and may be electrically connected by one or more through-silicon vias (TSVs). Processors which are packaged with a memory device (whether embedded on a memory device or as part of a MCP, for example), may be referred to as "internal processors," and thus a memory device packaged with a processor may be considered a memory "having" an internal processor. As used herein, a "compute engine" may be an example of an internal processor, and may be packaged with a memory device in accordance with the present techniques. Further, an internal processor, such as a compute engine, may comprise one or more ALUs.

The memory may also include components such as a sequencer to organize the instructions, and a buffer to store (e.g., hold) data before the compute engine executes the operations. In some embodiments, the buffer may also hold intermediate results or final results before they are transferred to the memory array.

One embodiment of the present technique involves a memory configured such that writing, reading, sequencing, buffering, and executing instructions and/or data may occur substantially simultaneously on different instructions, or different parts of an instruction. Combinations of such parallel processing may be referred to as "pipelining." Pipelining in a memory device may save in processing time, as different parts of an instruction(s) may be read, buffered, executed, and/or written in parallel. Limitations in pipelining may be partly due to the configuration of a memory. In one or more embodiments of the present techniques, a memory having an internal processor may be configured to enable or improve pipelining.

Now turning to the figures, FIG. 1 depicts a processor-based system, generally designated by reference numeral 10. As is explained below, the system 10 may include various electronic devices manufactured in accordance with embodiments of the present technique. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include memory manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The input device 16 and/or the display 18 may each or both form a user interface. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by processing programs stored in the memory. The software programs may include an operating system, database software, drafting software, word processing software, and/or video, photo, or sound editing software, for example. The memory is operably coupled to the processor 12 to store and facilitate execution of instructions to implement various programs. For instance, the processor 12 may be coupled to the system memory 26, which may include dynamic random access memory (DRAM), and/or synchronous dynamic random access memory (SDRAM). The system memory 26 may include volatile memory, non-volatile memory, or a combination thereof. The system memory 26 is typically large so that it can store dynamically loaded applications and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store any necessary operating system, application programs, and fixed data. Additionally, the non-volatile memory 28 may include a high capacity memory such as a tape or disk drive memory, such as a hybrid-drive including resistive memory or other types of non-volatile solid-state memory, for instance.

Figure 2:
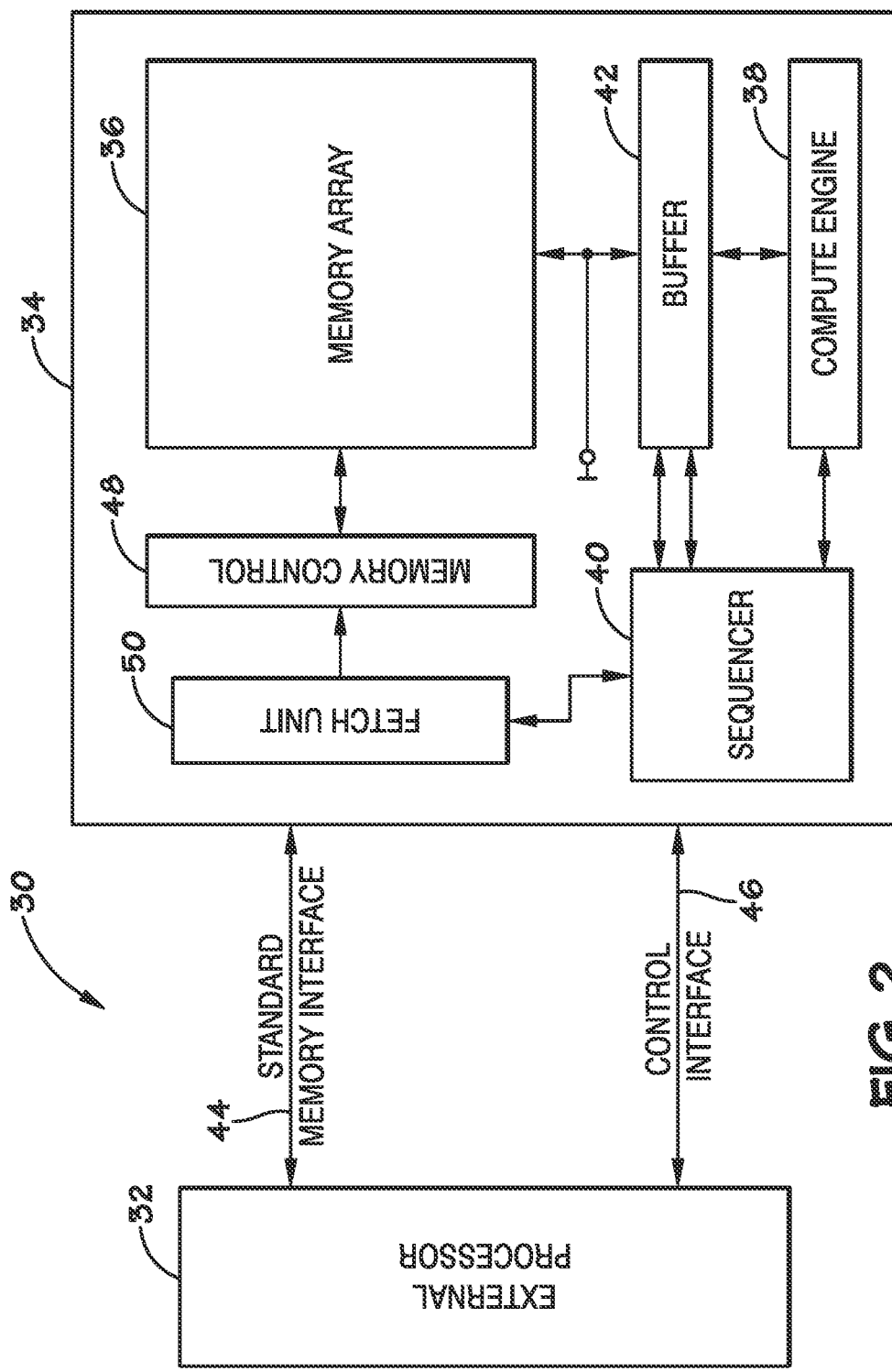
FIG. 2 depicts a block diagram of a memory system having an internal processor interfaced with an external processor, in accordance with an embodiment of the present technique.

Some embodiments of the present technique involve communication between the processor 12 and components of the system memory 26. For example, the processor 12 may include a general purpose processor, a central processing unit, a processor core, an ASIC, a memory controller, and/or an ALU, for example, capable of sending and receiving signals from internal processors of memory, such as memory devices in the system memory 26. Components of the system 10 involved in the communication between the processor 12 and the components of a memory such as system memory 26 may be generally referred to as a "memory system" 30, as illustrated in the block diagram of FIG. 2. In some embodiments, a memory system 30 may include a memory device 34, which may be part of the system memory 26 of the system 10 (as in FIG. 1) and may have an internal processor such as the compute engine 38. As discussed, the compute engine 38 may be embedded on the memory device 34 or part of a MCP with the memory device 34, for example. The memory system 30 may also include an external processor 32, which may be in a system-on-a-chip (SOC) with a more general purpose processor to collectively form a processor 12 of a processor-controlled system 10 (as in FIG. 1). The external processor 32, which may also be an external memory controller, may communicate with and/or control certain components of a memory device 34.

The memory system 30 may include components which have functions that are not limited to the communication between the external processor 32 and the memory device 32. For example, the external processor 32 may control devices in addition to the memory device 34. However, the external processor 32, as explained with respect to the memory system 30, may refer to one function of the external processor 32 which communicates with and/or controls certain components of the memory device 34. Likewise, not all parts of the system memory 26 may be part of the memory system 30. The "memory device" 34 may refer to components of the memory system involved in the communication with the external processor 32, in accordance with the present techniques.

The external processor 32 and the memory device 34 may be operably coupled by a standard memory interface 44 which may allow data transfer between the external processor 32 and the memory device 34, and may allow the external processor 32 to send (e.g., transfer) commands to the memory device 34. In one or more embodiments, the types of standard memory interface 44 may include DDR, DDR2, DDR3, LPDDR, or LPDDR2, for example. Further, in some embodiments, an additional interface(s) may be configured to allow the transfer of data, and also commands (e.g., requests, grants, instructions, etc.), between the memory device 34 and the external processor 32. For example, the external processor 32 and the memory device 34 may also be operably coupled by a control interface 46, which may allow the transfer of commands between the external processor 32 and the memory device 34, including commands from the memory device 34 to the external processor 32.

The memory device 34 may include a compute engine 38 and a memory array 36. The memory array 36 may refer to any suitable form of storage, and may include, for example, a DRAM array or an SDRAM array. The external processor 32 (e.g., a memory controller) may have access to the memory array 36, and may be able to write data or instructions to be executed by the compute engine 38. The compute engine 38 may be one example of an internal processor, and may include one or more arithmetic logic units (ALUs). Further, the compute engine 38 may refer to a plurality of compute engines 38 on the memory device 34.

The compute engine 38 may be capable of accessing the memory array 36, including retrieving information from, and storing information (e.g., retiring results) in the memory array 36. The process of retrieving and storing information between the compute engine 38 and the memory array 36 may involve a sequencer 40, a fetch unit 50, a memory control 48, and a memory component, such as the buffer 42.

The sequencer 40 may sequence the instructions sent by the external processor 32 to the memory array 36 and store the data retrieved from the memory array 36 in a memory component such as the buffer 42. The sequencer 40 may pass the address and command information for accessing the memory array 36 to the fetch unit 50, and the fetch unit 50 may sequence the memory array 36 states according to the command information (e.g., open or close a bank according to read and write commands). In one embodiment, the memory control 48 may decode the command and address bits received by the fetch unit 50 from the sequencer 40.

Once the compute engine 38 has executed the instructions, the results may be stored in the buffer 42 before they are written to the memory array 36. Further, as some instructions may require more than one clock cycle in the compute engine and/or require multiple operations to be performed, intermediate results may also be stored in memory components in the memory device 34. For example, intermediate results may be stored in memory components such as the buffer 42 or memory registers coupled to the compute engine 38. In one or more embodiments, a compute engine 38 may access the buffer 42 for the intermediate results to perform subsequent operations.

In some embodiments, the buffer 42 may include more than one layer of buffers. For example, the buffer 42 may include a compute buffer, which may store data (e.g., operands) and instructions, and an instruction buffer, which may store instructions. The buffer 42 may also include additional buffers, such as a data buffer or a simple buffer, which may provide denser storage, and may store intermediate or final results of executed instructions. As used herein, "buffer 42" may refer to, for example, any type or layer of buffer (e.g., a compute buffer, instruction buffer, data buffer, etc.), or any type of memory capable of holding data and/or instructions transferred to and from the compute engine 38.

In a typical memory system 30, an external processor 32 may store data and instructions in the memory array 36 on the memory device 34. A sequencer 40 may access the memory array 36 to retrieve the instructions, and may copy the data from the memory array 36 to the buffer 42. The compute engine 38 may execute instructions on data that is stored in the compute buffers. Typically, a sequencer 40 may wait for a transfer between the memory array 36 and the compute buffer 42 to complete before initiating a subsequent transfer. However, processing speed may be increased if transfers between the memory array 36 and the compute buffer 42 may be increased.

Figure 3:
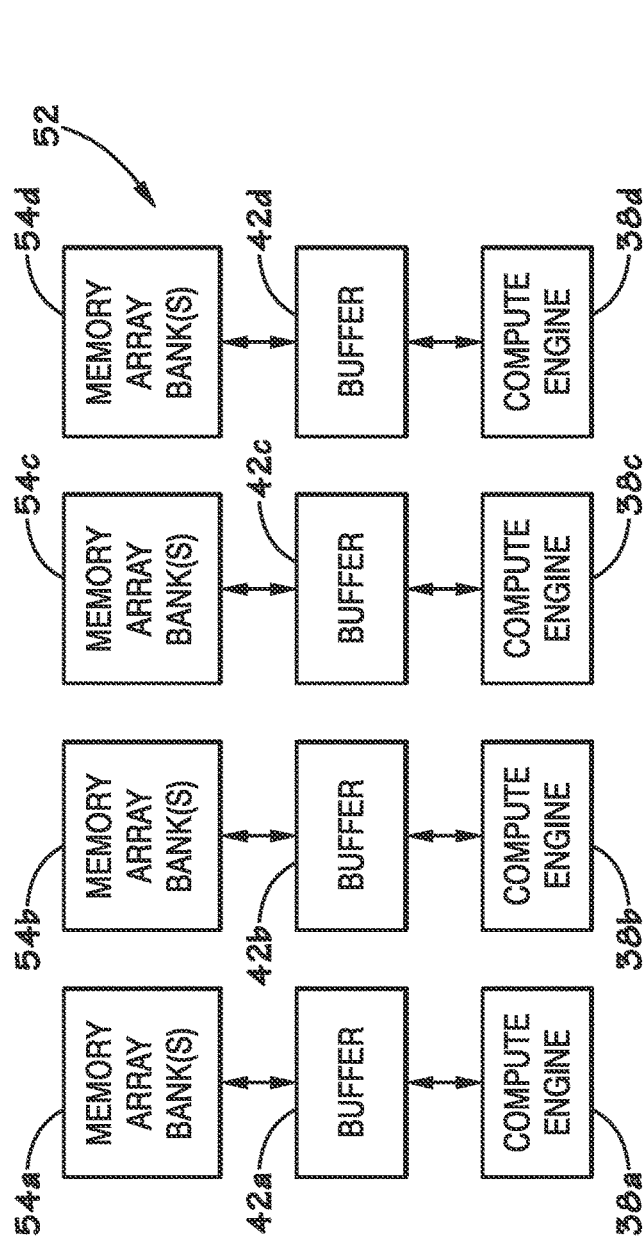
FIG. 3 illustrates a portion of a memory having an internal processor, where the internal processor and a buffer are coupled to one or more banks of a memory array, in accordance with one or more embodiments of the present technique.

For example, in one embodiment as depicted in a portion of a memory device 52 in FIG. 3, multiple transfers between the memory array 36 and the buffer 42 may occur substantially simultaneously by coupling one or more buffers 42a-42d to one or more groups of memory cells, such as banks 54a-54d of the memory array 36. A memory device 52 may have one or more compute engines 38a-d (e.g., each compute engine 38a-38d may comprise one or more ALUs) coupled to each buffer 42a-42d. Each bank 54a-54d may include one or more banks. For example, multiple banks could be coupled to each buffer 42a-42d, which is coupled to each compute engine 38a-38d.

In one embodiment, a compute engine 38a may execute instructions on data stored in the buffer 42a and retrieved from a page of the memory bank 54a of the memory array 36, and at the same time, another compute engine 38b may execute instructions on data stored in the buffer 42b and retrieved from a page of another memory bank 54a of the memory array 36. Further, another compute engine 38c may transfer completed results to the buffer 42c, which may store the completed results to a page of another bank 54c in the memory array 36. Thus, rather than waiting for each transfer between a memory array 36 and a buffer 42 to complete, transfers between pages of different banks 54a-54d of the memory array 36 and buffers 42a-42d coupled to compute engines 38a-38d may occur substantially simultaneously.

Figure 4:
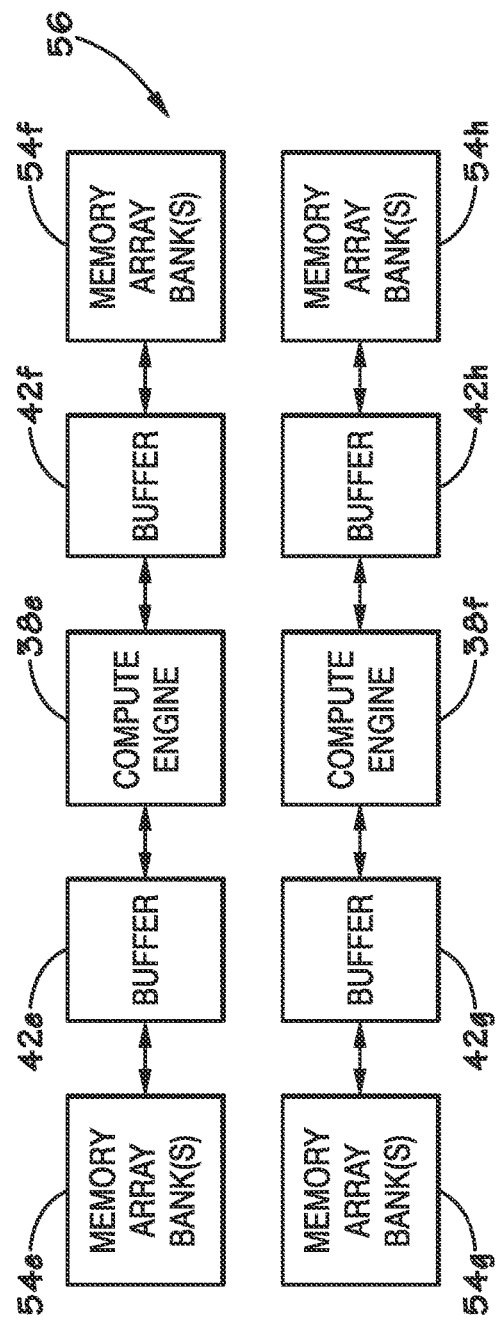
FIG. 4 illustrates a portion of a memory having an internal processor, where the internal processor is coupled to two or more buffers and banks of a memory array, in accordance with one or more embodiments of the present technique.

In another embodiment, as illustrated in a memory device portion 56 in FIG. 4, each compute engine 38e and 38f may be coupled to more than one buffer 42e-42f and 42g-42h, respectively, and each buffer 42e-42h may be coupled to one or more banks 54e-54h of a memory array 36. As each compute engine 38e and 38f is coupled to at least two buffers 42e-42f and 42g-42h, each compute engine 38e and 38f may retrieve data and store completed results simultaneously. For example, the buffer 42e may retrieve operands from one or more memory array banks 54e, and the compute engine unit 38e may execute instructions on those operands. Once the compute engine unit 38e has executed instructions on the operands, the completed results may be held in the compute buffer 42f and stored in one or more memory array banks 54f. While completed results are being passed to the buffer 42f and/or stored in the bank 54f, the buffer 42e may be pre-fetching operands (e.g., retrieving the operands for the next instruction or operation) from the bank 54e. Thus, the compute engine 38e may not have to wait for a buffer to finish retiring completed results before the next set of operands is retrieved, as retrieving and storing data may occur substantially simultaneously by different buffers 42e and 42f to different banks 54e and 54f.

Depending on the instruction and/or the data to be operated by a compute engine 38, processing efficiency may also be increased by distributing the execution of instructions (or parts of instructions) across multiple compute engines 38. For example, an instruction x may be divided into operations m, n, o, and p. Each operation may have intermediate results that become operands for a subsequent operation. For example, operation m may produce results that are operands for operation n, and operation n may produce results that are operands for operation o, and so forth. In one embodiment, a sequencer 40 (in FIG. 2) may designate the performance of operations by one or more compute engines 38 in the memory device 34. In another embodiment, the external processor 32 may substantially control the division of an instruction into operations and the designation of the operations to one or more compute engines 38. Further, in another embodiment, the division of instructions and/or the designation of operations to compute engines 38 may be controlled largely on the memory device 34.

One embodiment of efficiently distributing and executing multiple operations of an instruction(s) may be to enable communication between compute engines 38 in a memory device 34. More specifically, a memory device 34 may comprise multiple compute engines 38, and one or more buffers 42 may be coupled to each compute engine 38. The buffers 42 may also each be coupled to another buffer 42. For example, a buffer 42 in one row may be directly bussed to a buffer 42 in another row in the memory device 34. Thus, data may be transferred between compute engines 38 via the buffers 42, saving one or more data transfers between a buffer 42 and the memory array 36.

Figure 5:
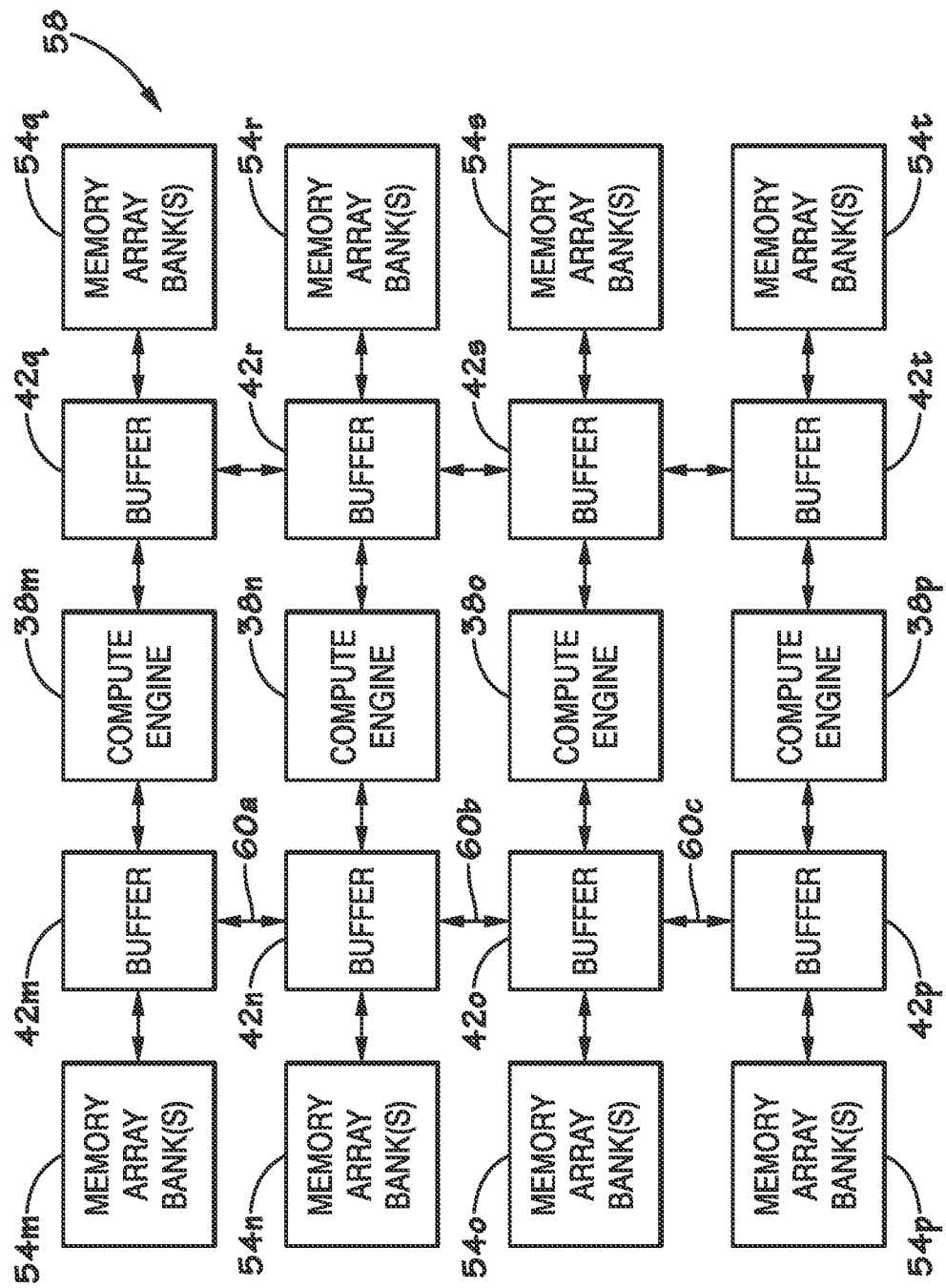
FIG. 5 illustrates a portion of a memory having internal processors, wherein the internal processors are each coupled to two or more buffers and banks of a memory array, and wherein each of the buffers is coupled to another buffer that is coupled to another one of the internal processors, in accordance with one or more embodiments of the present technique.

As illustrated in the diagram of a memory device portion 58 in FIG. 5, multiple compute engines 38m-38p may communicate by transferring data and/or operations (i.e., a part(s) of an instruction(s)), such that one or more instructions may be executed in parallel. Parallel execution of an instruction may involve executing the instruction in multiple operation steps. Each operation may be performed by a compute engine 38m-38p, and the intermediate results from one operation performed by one compute engine 38 may be transferred as operands for a different operation to be performed by another compute engine 38. Data, such as the intermediate results, may be transferred from one compute engine 38 to another via buffers 42 which may be coupled to each compute engine 38. In one or more embodiments, a buffer 42 may be operably coupled (e.g., directly connected via a bus 60) to buffer 42 in another row to enable information transfer between buffers 42.

For example, information, which may include instructions and/or operands for the instructions, may be stored in the memory array bank 54p. Depending on the configuration of the memory device 34, the compute engine(s) 38m-38p designated for executing the part of the instruction may not be adjacent to the buffer 42p configured to access the bank 54p containing the data. For example, if the instructions are divided into distinct operations, one or more of the compute engines 38m-38p designated for performing an operation may not be physically located next to the buffer 42p holding the data for that operation, and may not be physically located next to other compute engines 38m-38p performing other operations of the same instruction.

In one embodiment, the information may be transferred from the bank 54p to a buffer 42p configured to access the bank 54p. The first operation may not be designated for a compute engine 38p that is adjacent to the buffer 42p, and may instead be designated for a compute engine 38m that is not physically located next to the buffer 42p. Thus, the buffer 42p may transfer the instructions through one or more buses 60a-c to intermediate buffers 42o and 42n until the first operation of the set of instruction(s) is received at the targeted buffer 42m (i.e., the buffer that is directly coupled to the targeted compute engine 38m).

The buses 60 which may couple any number or combination of buffers 42 may be wide, and may transfer an entire row of data in one cycle. In some embodiments, the buses 60 may be relatively narrow, and may transfer a row of data over multiple cycles. In one or more embodiments, the buses 60 may each be unidirectional, or bidirectional, and a memory device 34 may have an assortment of buses 60 which may be unidirectional or bidirectional, or narrow or wide.

Further, one bus 60a may transfer a different amount of data than subsequent buses 60b and 60c. For example, the compute engine 38p may be designated to perform an operation p, and data related to the operation p may be held in the buffer 42p after the data is transferred from the bank 54p to the buffer 42p. The compute engine 38o may be designated to perform an operation o, and data related to the operation o may be held in the buffer 42o. Other data for executing the instruction may then be transferred from the buffer 42o to the next buffer 42n. If the compute engine 38n is designated to perform an operation n, the instructions related to the operation n may be held in the buffer 42n, while other data may be transferred from the buffer 42n to the next buffer 42m. The buffer 42m may hold data for the compute engine 38m, and operands and instructions for the compute engine 38m may be transferred from the buffer 42m to the compute engine 38m, such that the compute engine 38m may perform operation m.

As previously discussed with respect to FIG. 4, the compute engines 38m-38p may perform operations while buffers 42m-42p continuously retrieve data for the next operation or instruction. Substantially simultaneously, the compute engines 38m-p may transfer intermediate results or final results of some operation or instruction to other buffers 42*q*-42*t*, also coupled to the compute engines 38*m*-38*p*. The other buffers 42*q*-42*t* may either transfer an intermediate result from one buffer 42*q* to another buffer 42*r* via a bus 60, for example, such that an intermediate result of an operation m performed by one compute engine 38*m* may be used as an operand in a next operation n to be performed by another compute engine 38*n*. Once an instruction has been executed (i.e., all the operations of an instruction have been performed), the final result may be transferred from the compute engine 38*p* to the buffer 42*t*, such that the buffer 42*t* may store the final results in a memory array bank 54*t*. In one embodiment, final results may be stored in any memory array bank 54*t*, regardless of whether the bank 54 is adjacent to the buffer 42*t* holding the final results. Thus, as multiple buffers 42 may be coupled to a compute engine 38, retrieving and storing data may occur substantially simultaneously, via different buffers 42 and/or on different memory array banks 54.

While the communication path between compute engines 38 via buffers 42 illustrated vertical buses 60 between rows of buffers 42 in FIG. 5, in accordance with the present techniques, one or more buffers 42 may also be horizontally coupled, as depicted in the memory device portion 62 of FIG. 6. For example, using the compute engine 38*m* and the associated buffers 42 *m* and 42*q* and banks 54*m* and 54*q* (from FIG. 5) as an example, the buffers 42*m* and 42*q* may also be coupled via a horizontal bus 64, such that buffer 42*m* and that are coupled to the compute engine 38*m* may also be coupled to one another, and data may be transferred from one buffer 42*m* to another buffer 42*q*. In one or more embodiments, the horizontal bus 64 may enable the memory device 34 to transfer data in large quantities, as each buffer 42*m* and 42*q* coupled to the compute engine 38*m* may hold data for operations to be performed or entire instructions to be executed by the compute engine 38*m*. Similar to the buses 60 previously discussed, the horizontal bus 64 may also be either unidirectional or bidirectional, and may be wide or narrow in data transfer capabilities.

Furthermore, in one embodiment, the compute engine 38*m* may retrieve data from one memory array bank 54*m*, and may store final results to another bank 54*q* after it has executed an instruction. This retrieving and storing of data may also occur substantially simultaneously, as the buffer 42*q* may store data in the bank 54*q*, and the buffer 42*m* may not need to wait for the transfer between the buffer 42*q* and the bank 54*q* to complete before retrieving the next data from the bank 54*m*. As discussed, the simultaneous retrieving and storing of data may enable faster processing performance of the memory device 34.

In one or more embodiments, each compute engine 38 may be coupled to a buffer 42 that is capable of communicating with multiple memory array banks 54. For example, in one implementation of a memory device portion 66, a bidirectional bus may couple one memory array bank 54*w* to another memory array bank 54*x*, as illustrated in FIG. 7. Data may be transferred via a bus 68 between the banks 54*w* and 54*x*, and a buffer 42 may also transfer data to or from either of the banks 54*w* and 54*x*. Therefore, the compute engine 38 may perform operations or execute entire instructions using data retrieved from either of the coupled banks 54*w* and 54*x* to which the buffer 42 has access, and may store results of the operations or instructions in either of the banks 54*w* and 54*x*. In such an implementation, access may be limited to one memory array bank 54 at one time, as only one bus 70 exists between the buffer 42 and any of the coupled banks 54*w* and 54*x*. For example, if data is being stored from the buffer 42 to the bank 54*x*, the compute engine 38 may have to wait for this transfer to complete before it can perform operations on data to be retrieved from the bank 54*w* to the buffer 42.

In another embodiment, the compute engine 38 may again be coupled to a buffer 42 that is coupled to more than one memory array bank 54. For example, as depicted in the memory device portion 72 of FIG. 8, the buffer 42 may be coupled via a bus 74*y* to a memory array bank 54*y*, and another bus 74*z* to another bank 54*z*. In one embodiment, not only may data be retrieved from and stored in different banks 54, data may also be retrieved and stored concurrently, as the buffer 42 may have more than one bus coupling to different banks 54 of a memory array 36. For example, data may be stored from the buffer 42 to the bank 54*z* via the bus 74*z* while data is retrieved from the bank 54*y* to the buffer 42 via the bus 74*y*. This embodiment may enable the compute engine 38 to continuously perform operations or continuously execute entire instructions, without being limited by the bandwidth of buses or buffers in transferring data, thus improving processing performance. Each of the buses 74 between the buffer 42 and different memory array banks 54 may be of different widths, and may be either bidirectional or unidirectional (e.g., one bus 74*y* may be bidirectional, while another bus 74*z* may be unidirectional).

While the discussed figures refer to a memory array bank 54, each reference of a memory array bank 54 (e.g., 54*a*, 54*e*, 54*m*, 54*x*, 54*y*) may refer to one or more banks 54 of the memory array 36. Each reference of a buffer 42 may refer to one or more layers of buffers 42, or any type of buffer (e.g., instruction buffer, compute buffer, data buffer, etc.). Furthermore, each reference to a compute engine 38 may refer to a compute engine 38 having any size (e.g., a 128 byte ALU or a 256 byte ALU, etc.), and references to multiple compute engines 38 on a memory device 34 or a memory device portion (e.g., memory device portions 52, 56, 58, 62, 66, 72) may include multiple compute engines 38, each having different sizes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a processor-in-memory device, the processor-in-memory device comprising:
a plurality of internal processors;
a plurality of memory array banks of a memory array;
a plurality of buffers; and
an external processor, wherein the external processor is configured to transfer instructions to the processor-in-memory device via a standard memory interface, and wherein the external processor is configured to control division of the transferred instructions.

2. The system of claim 1, wherein each internal processor of the plurality of internal processors is coupled to at least one memory array bank of the plurality of memory array banks.

3. The system of claim 1, wherein each internal processor of the plurality of internal processors is coupled to at least two memory array banks of the plurality of memory array banks.

4. The system of claim 1, wherein a buffer of the plurality of buffers is configured to couple each internal processor of the plurality of internal processors to each memory array bank of the plurality of memory array banks.

5. The system of claim 1, wherein the standard memory interface comprises DDR, DDR2, DDR3, LPDDR, or LPDDR2.

6. The system of claim 5, wherein the system memory comprises a dynamic random-access memory.

7. The system of claim 1, wherein the standard memory interface is configured to send commands from the external processor to the processor-in-memory device.

8. A system comprising: a processor-in-memory device, the processor-in-memory device comprising: a plurality of internal processors; a plurality of memory array banks of a memory array; a plurality of buffers; a system memory, wherein the system memory comprises a dynamic random-access memory; and an external processor, wherein the external processor is configured to transfer instructions to the processor-in-memory device and/or the system memory via a standard memory interface and wherein the external processor is configured to control division of the transferred instructions.

9. The system of claim 8, wherein each internal processor of the plurality of internal processors is coupled to at least one memory array bank of the plurality of memory array banks.

10. The system of claim 8, wherein each internal processor of the plurality of internal processors is coupled to at least two memory array banks of the plurality of memory array banks.

11. The system of claim 8, wherein the standard memory interface is configured to interface with the dynamic random-access memory of the system memory.

12. The system of claim 8, wherein the external processor is configured to dynamically switch between communication to the system memory and the processor-in-memory device.

13. The system of claim 8, wherein the processor-in-memory device comprises a memory register coupled configured to store data for at least part of the transferred instructions.

14. The system of claim 8, wherein the processor-in-memory device comprises a fetch unit.

15. A system comprising:
a processor-in-memory device, the processor-in-memory device comprising:
a plurality of internal processors;
a plurality of memory array banks of a memory array; and
a plurality of buffers, wherein each of the plurality of buffers couple each of the plurality of internal processors to the plurality of memory array banks, and wherein the plurality of internal processors is configured to communicate through transfer of data;
an external processor, wherein the external processor is configured to transfer instructions to the processor-in-memory device;
a sequencer configured to sequence instructions sent by the external processor to the processor-in-memory device; and
wherein the processor-in-memory device is configured to receive instructions from the sequencer, and wherein the processor-in-memory device is configured to execute the instructions in parallel.

16. The system of claim 15, wherein the instructions comprise one or more read commands and/or one or more write commands.

17. The system of claim 16, wherein the processor-in-memory device is configured to substantially simultaneously execute the one or more read commands and the one or more write commands of the sequenced instructions.

18. The system of claim 15, wherein the external processor is configured to communicate with the processor-in-memory via a standard memory interface.

19. The system of claim 15, wherein the external processor is configured to communicate with the processor-in-memory via a control interface.

20. The system of claim 15, wherein the external processor is configured to communicate with the processor-in-memory via a control interface and a system memory via a standard memory interface.

* * * * *